UNITED STATES PATENT OFFICE.

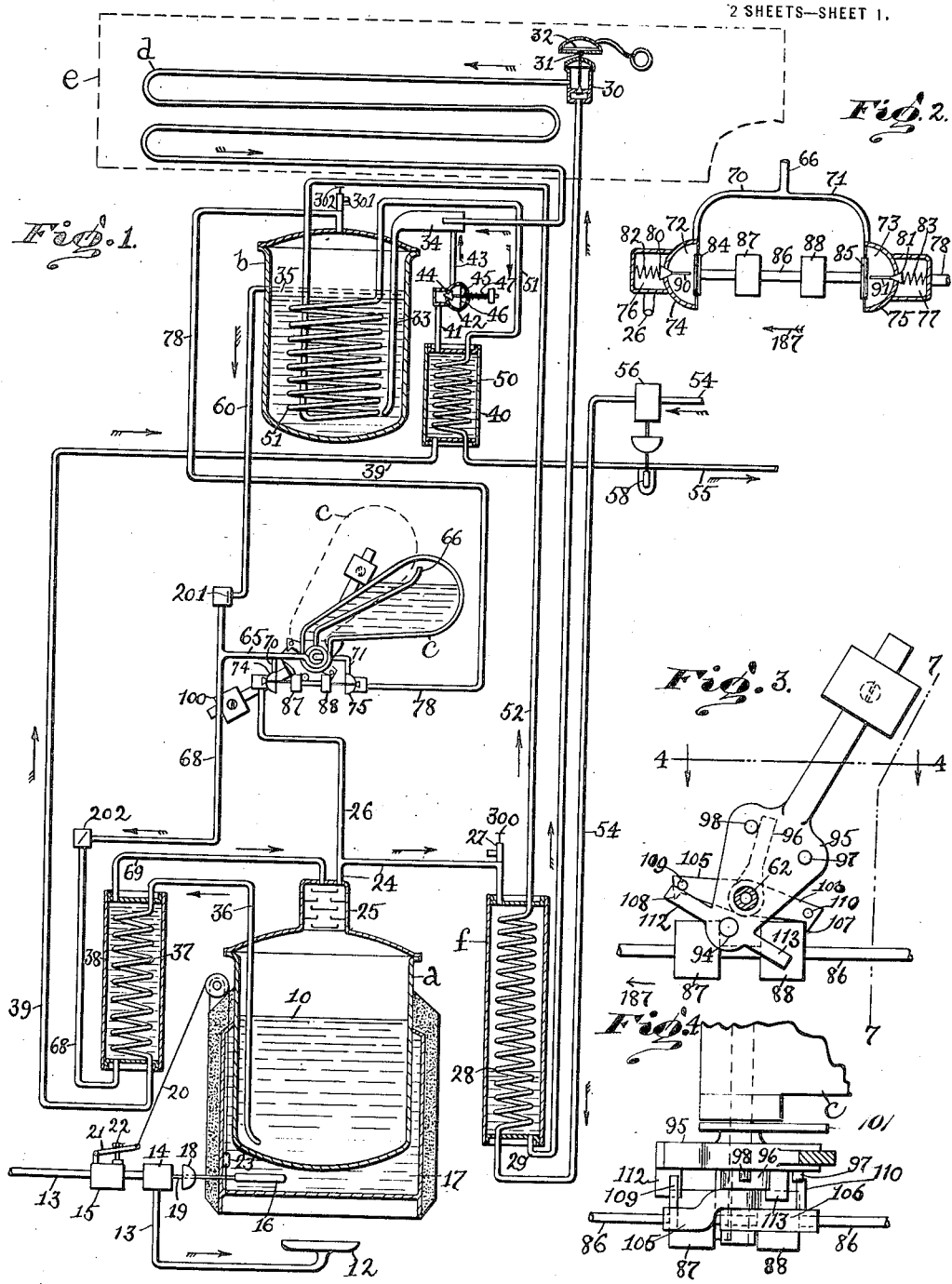

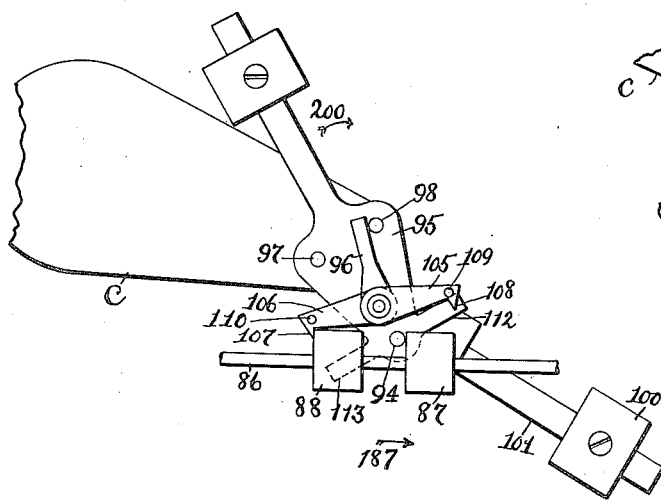
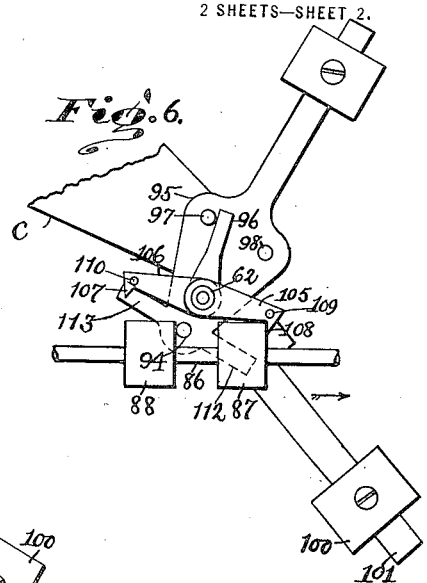
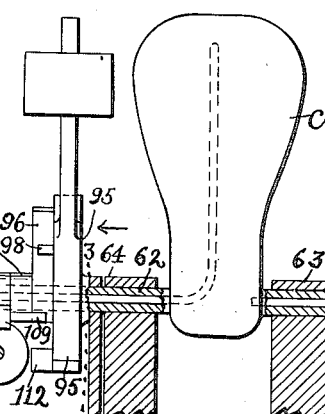
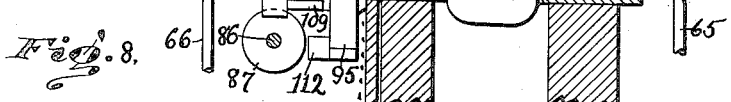
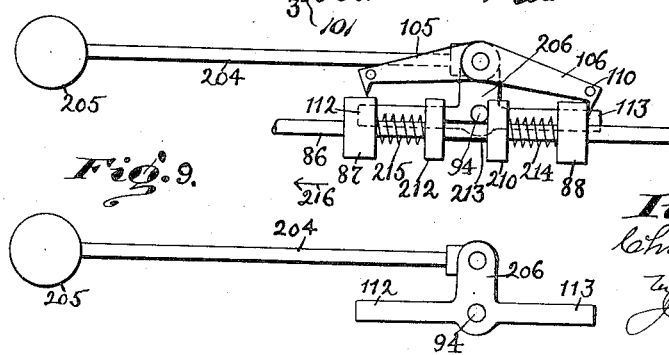

CHARLES W. HAPGOOD, OF BOSTON, MASSACHUSETTS.

REFRIGERATING APPARATUS.

1,427,379.    Specification of Letters Patent.    Patented Aug. 29, 1922.

Application filed November 22, 1916. Serial No. 132,889.

*To all whom it may concern:*

Be it known that I, CHARLES W. HAPGOOD, a citizen of the United States, and a resident of Boston, in the county of Suffolk and State of Massachusetts, have invented an Improvement in Refrigerating Apparatus, of which the following description, in connection with the accompanying drawings, is a specification, like characters on the drawings representing like parts.

This invention relates to a refrigerating apparatus or system of the absorption type, and has for its object to provide a continuous absorption system or apparatus, which is capable of general use but is especially adapted for small units such as households, and which is automatic in operation, reliable, hermetically sealed, safe to use, and inexpensive in cost and maintenance.

To this end, the system or apparatus is provided with a generator or still, an absorber, an expansion coil or chamber between the generator and absorber and connected therewith for the continuous flow of refrigerant from the generator to the absorber through the expansion coil, and is also provided with an expansion valve governing the flow of refrigerant to the expansion coil and responsive to temperature changes in the refrigerated space, whereby the amount or magnitude of the refrigeration is responsive to the temperature changes in the refrigerated space, without interrupting the continuity of the refrigeration produced by the system or apparatus. Provision is also made for the continuous flow of weak liquor from the generator to the absorber, and for an intermittent flow of strong liquor from the absorber to a trap or receptacle, and from the latter to the generator.

Provision is also made for equalizing the pressure between the trap and the absorber, and between the trap and the generator, and for controlling communication between said vessels, whereby the generator is cut off from the trap before the latter is connected with the absorber and vice versa.

Provision is also made for automatically controlling the heat for generating gaseous refrigerant, for controlling the condensing water or liquid employed, and the quantity or amount of weak liquor admitted into the absorber, as will be described.

These and other features of this invention will be pointed out in the claims at the end of this specification.

Fig. 1 is a diagrammatic view of a refrigerating system embodying this invention.

Fig. 2, a detail of the valves preferred by me for controlling communication between the trap and the absorber and generator.

Fig. 3, a detail of the valve shifting device shown in Fig. 1, being a section on line 3—3 Fig. 7, looking in the direction of arrow thereon.

Fig. 4, a detail in plan and section of the device shown in Fig. 3, the section being taken on the line 4—4, Fig. 3.

Fig. 5, an elevation of the shifting device looking from the opposite side of the trap shown in Fig. 1.

Fig. 6, a view like Fig. 5 with the trap in its filling position.

Fig. 7, a section on the line 7—7, Fig. 3, and

Figs. 8 and 9, modifications of the valve shifting device to be referred to.

In Fig. 1 is represented a preferred form of refrigerating apparatus or system embodying the invention, in which $a$ represents a generator or still, $b$ an absorber, $c$ an intermediate vessel or trap, $d$ an expansion coil or chamber located in a chamber or space $e$ to be refrigerated, and $f$ a condenser for the gaseous refrigerant, which latter may be any desired refrigerant, preferably ethyl chloride or the like. The generator $a$, trap $c$ and absorber $b$ are located with respect to one another as hereinshown, so that a liquid charged with refrigerant my gravitate from the absorber $b$ into the trap $c$, and from the latter to the generator $a$, as will be described.

The generator $a$ is designed to be heated so as to drive off gaseous refrigerant from the charged liquid 10 contained therein, which may be effected by a suitable heater, herein represented as a gas burner 12, attached to a gas supply pipe 13, containing as hereinshown two valves 14, 15, for a purpose as will be described.

These valves are conventionally shown and each is designed to control the supply of gas to the burner 12. The valve 14 is represented as an automatic valve, which is designed to be opened more or less according to the temperature of the liquid 10 in the generator or still $a$, and this may be accomplished in a manner well understood by a volatile fluid in a tube 16 located in the water bath 17, by which the generator is directly heated. The tube 16 is connected with a chamber 18 containing a diaphragm (not shown) with which the stem 19 of the valve 14 is connected. The valve 15 is designed to be held open as long as the heat in the generator remains below a predetermined point, dependent upon the refrigerant used, which may be effected as shown by a cord 20 having one end attached to a lever 21, engaged with the stem 22 of the valve 15, and having its other end led into the water bath and connected with a fusible link 23, which is suitably anchored.

The generator $a$ is provided with an outlet pipe 24 for gaseous refrigerant, which pipe is connected at one end with a dome 25 for the generator and at the other end with the condenser $f$, and said gas outlet pipe is provided with branch pipes 26, 27, for a purpose as will be described.

The condenser $f$ contains a coil 28 for cooling water or other medium and has its outlet pipe 29 connected with an expansion valve 30 of known construction, which is connected with the expansion coil $d$ and controls the flow of liquid refrigerant from the condenser $f$ to said expansion coil. In the present instance, the valve proper of the expansion valve 30 is closed by a spring 31 and opened by gaseous pressure acting on a diaphragm 32, which gaseous pressure is created by temperature changes in the space $e$ to be refrigerated, which space may for example be a chamber in an ordinary household refrigerator. The liquid refrigerant admitted into the expansion coil $d$ expands into gaseous form and produces refrigeration in the chamber or space $e$, and the gaseous refrigerant generated in the coil $d$ flows into the absorber $b$, which is provided with a gas inlet pipe 33 extended to near the bottom of the absorber and having an enlarged inlet end 34, which is closed and into which the end of the expansion coil $d$ extends.

The absorber $b$ contains liquid 35 to be charged, and for sake of distinction, the liquor charged with refrigerant may be designated strong liquor and the liquor to be charged weak liquor.

The weak liquor is continuously supplied to the absorber $b$ from the generator or still $a$ while the system is in operation, by the difference in pressure in these chambers. In the present instance, the generator $a$ is provided with a liquid outlet pipe 36 extended to near the bottom of the generator and connected with one end of a coil 37 located in a closed chamber or vessel 38, the other end of the coil 37 being connected by a pipe 39 with the bottom of a chamber or vessel 40, whose upper end is connected by a pipe 41 with an automatic valve 42, herein represented as of the diaphragm type. The automatic valve 42 is connected by a pipe 43 with the enlarged inlet end 34 of the gas inlet pipe 33 for the absorber $b$, which enlarged end forms one form of mixing chamber. The automatic valve 42 is provided with a valve proper 44, whose stem 45 is moved in one direction by a diaphragm 46 to open the valve, and in the opposite direction to close the valve by a spring 47.

The weak liquor is forced by the greater pressure in the still or generator $a$ through the outlet pipe 36 into the coil 37, thence through the pipe 39 into the vessel 40, thence through the pipe 41 to the automatic valve 42, thence through the pipe 43 into the mixing chamber 34 where it meets the expended gaseous refrigerant from the expansion coil $d$ and is mixed therewith, and the mixture of weak liquor and gas passes into the absorber $b$, wherein the weak liquor accumulates and absorbs the gaseous refrigerant, until sufficient gas has been absorbed to convert the weak liquor into a strong liquor. The weak liquor may be cooled on its passage to the absorber, by a cooling medium such as water, which flows through a coil 50 of pipe located in the chamber or vessel 40, and may be further cooled by a cooling coil 51 located in the absorber $b$ and connected in circuit with the cooling coil 50 by the pipe 51, and with the coil 28 in the condenser $f$ by pipe 52. The coil 28 is connected with a water main or other suitable source of supply by the pipe 54, and the coil 50 is connected with the sewer or other waste by the pipe 55. The pipes 54, 55, may be designated the supply and return or outlet pipes for the cooling or condensing water or medium, and the supply pipe 54 may and preferably will be provided with an automatic valve 56 of known construction, which is responsive to the temperature of the water in the return or outlet pipe 55, and regulates the quantity of water supplied to the coils in the cooling circuit. The automatic valve 56 is conventionally shown and its valve proper is actuated by a diaphragm which responds to pressure of a volatile medium in a bulb 58 located in the return pipe 55 and exposed to the temperature of the water passing through said return pipe.

The liquor in the absorber $b$ is charged with the gaseous refrigerant from the expansion coil $d$ and in time is converted into a strong liquor, which flows from the absorber through an outlet pipe 60 which connects the upper part of the absorber with the trap $c$. In the present instance, the trap $c$ is represented as movable from an inclined position indicated by dotted lines in Fig. 1, into a substantially horizontal position indicated by full lines, and vice versa, and when in its inclined position, said trap is designed to be connected with the absorber for the flow by gravity of the strong liquor from the absorber into the trap, and while the trap is being filled with strong liquor, the said trap is designed to be cut off from the generator or still, until the trap has been filled with strong liquor up to a predetermined level, whereupon it is designed that the trap should be dumped or turned so as to be cut off from the absorber *b* and be connected with the generator or still *a* to discharge the strong liquor into the latter.

When the trap *c* has discharged its contents, it is designed to be returned to its inclined position, so as to be cut off from the generator and connected with the absorber to be again filled with strong liquor.

In the present instance, one construction of trap is illustrated, and consists of a chamber or vessel provided with hollow trunnions 61, 62, see Fig. 7, mounted to turn in suitable bearings 63, 64. Through one of the trunnions as 61 is led the end of the pipe 65, which latter may be designated the liquid inlet and outlet pipe for the trap, and through the other trunnion 62 is led a pipe 66, which is extended up within the trap above the level of liquor therein. The pipe 66 may be designated the equalizer or gas inlet and outlet pipe for the trap. The liquid inlet and outlet pipe 65 is connected with the outlet pipe 60 from the absorber and by a pipe 68 with the lower end of the closed vessel 38, whose upper end is connected by the pipe 69 with the dome 25 of the generator or still *a*, and when the trap *c* is dumped, the strong liquor flows from the trap by gravity through the pipes 65, 68 into the vessel 38, and when the latter is filled by one or more dumpings of the trap *c*, the strong liquor flows through the pipe 69 into the still or generator *a*. The pipes 65, 66, may be soldered or otherwise secured fluid tight to the trap so as to move therewith, and to permit such movement, the said pipes are provided with one or more bends.

The equalizer pipe 66 of the trap *c* is designed to be connected with the generator or still *a* when the trap is dumping its load or liquid contents, and to be disconnected from the absorber *b* at such time, and when the trap is being filled with strong liquor from the absorber *b*, the trap is designed to have its equalizer pipe 66 connected with the absorber and cut off from the generator or still *a*. These results may be accomplished as hereinshown by means of valves which control connection of the equalizer pipe 66 of the trap *c* with the generator *a* and absorber *b*, which valves are constructed and arranged so as to have one fully closed before the other valve is opened and vice versa.

In the present instance the gas or pressure inlet and outlet pipe 66 of the trap *c* is connected by the branch pipes 70, 71, see Fig. 2, with the chambers 72, 73 of two valve casings 74, 75, having chambers 76, 77. The chamber 76 is connected by the pipe 26 with the generator *a*, and the chamber 77 is connected by the pipe 78 with the absorber *b* above the level of the liquid outlet pipe 60 therefor. Communication between the chambers 72, 76, is controlled by a valve 80 and between the chambers 73, 77 by a valve 81. The valves 80, 81 are closed by springs 82, 83 and are opened by diaphragms 84, 85, which are connected together by a rod 86 having thereon two collars 87, 88 spaced apart.

The diaphragms 84, 85 are simultaneously moved in the same direction by moving the rod 86 longitudinally, and the rod 86 is designed to be moved in the direction of the arrow 187 when the trap is dumped or moved from its dotted line position in Fig. 1 into its full line position, and the said rod is moved in the direction opposite to that indicated by the arrow 187, when the trap is raised from its full line position into its dotted line position.

Provision is made for ensuring that the valve 80 is closed before the valve 81 is opened and vice versa. To this end the stems 90, 91, of the valves 80, 81, are arranged with relation to the diaphragms 84, 85, so as to be separated therefrom by a slight space when the rod 86 is in what may be termed its neutral or central position, represented in Fig. 2, at which time both valves are placed under the control of their springs 82, 83, and are closed. As a result, when the rod 86 is moved beyond its central position in either direction to bring one of the diaphragms into engagement with the stem of one of the valves, and thereby open said valve, the other valve remains closed as the diaphragm which cooperates with its stem is moved away from the latter.

The movement of the rod 86 in opposite directions may be effected as hereinshown by means of a pin 94 projecting laterally from an oscillating lever 95 mounted loosely on the trunnion 62.

The pin 94 is extended between the collars 87, 88 and engages the collar 87 to open the valve 80, and engages the collar 88 to open the valve 81. These two positions of the pin 94 are represented in Figs. 5 and 6.

The oscillating lever 95 is moved in opposite directions by an arm 96, which is fast on the trunnion 62 to turn therewith and is extended between two studs or pins 97, 98, projecting from the lever 95. Provision is made for locking the valve actuating rod 86 so as to prevent the valves being accidentally opened during the period in which the trap is moving from one position to another. For this purpose, the trunnion 62 has loose on it two levers or latches 105, 106, which cooperate with the collars 87, 88, one of the latches as 106 being adapted to drop by gravity so that a tooth or finger 107 thereon engages the collar 88, see Fig. 5, when the rod 86 is moved to open the valve 80, thereby preventing said rod from being moved in the opposite direction to open the valve 81 while the trap is connected with the generator. The latch 105 is provided with a like finger 108 which engages the collar 87, see Fig. 6. when the valve 81 is open and the valve 80 is closed, thereby preventing the rod 86 from being moved to open the valve 80 while the trap is connected with the absorber.

Provision is made for disengaging the latches 105, 106 from the collars 87, 88, and for this purpose the said latches are provided with pins 109, 110, which are adapted to be engaged by fingers or arms 112, 113, on the rocking lever 95.

When the rocking lever 95 is turned into the position shown in Fig. 5, so as to open the valve 80 by engagement of the pin 94 with the collar 87, the arm 112 is first engaged with the pin 109 on the latch 105 and disengages the latter from the collar 87 thereby leaving the rod 86 free to be moved by the rocking lever 95 so as to open the valve 80. At the same time, the collar 88 is moved so as to permit the finger 107 on the latch 106 to drop behind it. When the rocking lever 95 is moved in the opposite direction and into the position shown in Fig. 6, the arm 113 on said lever first engages the pin 110 on the latch 106 and disengages it from the collar 88, thereby leaving the rod 86 free to be moved by the rocking lever to open the valve 81 and allow the valve 80 to be closed, and at the same time the collar 87 is moved so as to allow the latch 105 to engage it and lock the rod 86 against movement in the proper direction to close the valve 81 and open the valve 80.

When the trap c, is discharging as represented by full lines in Fig. 1 and also by Fig. 5, into which position the trap has been moved by the weight of the strong liquor therein, the rocking lever 95 is in the position shown in Fig. 5, with the pin 94 engaging the collar 87 and the pin 98 engaging the arm 96. At such time the valve 80 is open and the valve 81 closed, and the trap is connected with the generator and cut off from the absorber.

When the trap has discharged its liquid contents, it is raised by a counter weight 100 on an arm 101 attached to the trunnion 62, into its filling position shown in Fig. 6. On this movement of the trap, the arm 96 engaged with the pin 98 as shown in Fig. 5, rocks the lever 95 in the direction of arrow 200, Fig. 5, and when the lever 95 has been carried beyond a vertical plane through the trunnion 62, the lever descends by gravity into substantially the position shown in Fig. 6, thereby causing the arm 113 to release the latch 106 and bringing the pin 94 into engagement with the collar 88 which is moved thereby, so as to permit the spring 82 to close the valve 80 and so as to cause the diaphragm 85 to open the valve 81, the valve 80 being closed before the valve 81 is opened. The valve 80 in its closed position cuts off the trap from the generator and the valve 81 in its open position connects the trap with the absorber. When the trap has been filled with strong liquor from the absorber, the weight of the liquor turns the trap from its position shown in Fig. 6 into its lowered position in Fig. 5, and the arm 96 acting on the pin 97 moves the rocking lever 95 in the direction opposite to that indicated by arrow 200 and beyond the center, whereupon the lever drops and releases the latch 105, through the arm 112, and moves the rod 86 by the pin 94 so as to permit the valve 81 to be closed and so as to open the valve 80, the former being closed before the latter is opened.

By reference to Fig. 2, it will be seen that as the rod 86 passes through its central or neutral position, both diaphragms 84, 85, are disengaged from the valve stems 90, 91, consequently both valves are closed by their springs 82, 83, and the trap is cut off from both the generator and absorber when the rod 86 is in its neutral or central position.

The operation of the apparatus shown in Fig. 1, may be briefly described as follows: Assume the apparatus in the condition represented in Fig. 1, in which the trap is returning strong liquor to the generator or still a, and weak liquor in the absorber is being charged with gaseous refrigerant. In this case, the valve 80 is open and the generator is connected with the trap, so that the pressures therein are the same, which allows the strong liquor to flow by gravity from the trap through the pipes 65, 68, into the vessel 38, which is preferably of somewhat greater capacity than the trap so as to require more than one load from the trap to fill the vessel 38. While the trap is discharging strong liquor, weak liquor in the absorber is being charged with the gaseous refrigerant from the expansion coil, and at the same time weak liquor from the generator is being supplied to the absorber from the generator by the pressure in the latter forcing the weak liquor through the pipe 36, coil 37, pipe 39, vessel 40 and pipe 41 to the automatic valve 42, which is at such time open, and thence by pipe 43 into mixing chamber 34, where it mixes with the gaseous refrigerant from the expansion coil and is conducted by the inlet pipe 33 to the bottom of the absorber. The weak liquor accumulates in the absorber and is strengthened by absorbing the gaseous refrigerant, and the strong liquor thus formed overflows through the pipe 60 into the trap, when the latter has discharged its load of strong liquor and has been returned to its filling or inclined position indicated by the dotted lines in Fig. 1. When the trap is turned by the counter weight 100 into its inclined position, the valve 80 is closed, which cuts off the trap from the generator, and the valve 81 is opened which connects the trap with the absorber, thereby equalizing the pressures in the trap and absorber and allowing the strong liquor in the absorber to flow by gravity into the trap. When the trap has been filled, it is again dumped and the strong liquor flows into the vessel 38 and forces a part of the contents of the latter into the generator, where it is subjected to heat and the refrigerant in the strong liquor is driven off through the pipe 24 into the condenser $f$, wherein it is condensed, and the liquid refrigerant thus formed is forced by the pressure in the generator and condenser through the pipe 29 to the expansion valve 30 and thence into the expansion coil $d$, wherein it expands and flows in gaseous form into the absorber to strengthen the weak liquor therein. The liquor in the generator from which the gaseous refrigerant is driven off by the heat of the water bath in the present instance, is forced by the pressure in the generator into the absorber as above described and is replaced by the strong liquor from the vessel 38 and trap $c$.

It will be observed, that the strong liquor in the generator is subjected to heat at all times, and that liquid refrigerant is being supplied continuously to the expansion coil, and therefore the refrigeration effected by the apparatus is continuous. The quantity of liquid refrigerant supplied to the expansion coil is controlled by the expansion valve 30, which responds to variations in the temperature in the refrigerated space $e$, and as the temperature varies, the expansion valve is opened more or less to allow more or less liquid refrigerant to flow to the expansion coil, and as a result the system is continuous and always has a supply of liquid refrigerant flowing to the expansion chamber or coil according to the temperature of the refrigerated chamber or space $e$.

It will also be observed that the automatic valve 42 is connected with the absorber, so that the said valve responds to the pressure in the absorber to increase the flow of weak liquor from the generator into the absorber as the pressure in the latter increases, and to decrease the flow of weak liquor as the pressure in the absorber decreases, and as the pressure in the absorber is responsive to the operation of the expansion valve, in as much as the pressure increases in the absorber, as the expansion valve is opened to admit an increased flow of liquid refrigerant and vice versa, it will be seen that the expansion valve indirectly controls the flow of weak liquor to the absorber, in as much as the expansion valve affects the pressure in the absorber and this pressure controls the automatic valve governing the supply of weak liquor from the generator to the absorber.

By reason of the fact, that the increase in temperature in the refrigerating chamber or coil provides for an increase in flow of the weak liquor from the generator to the absorber, it is possible to increase the duty or amount of work done with the apparatus or system hereinshown, several hundred per cent above the normal. To illustrate, if by accident the door of the refrigerator should be left open or partially open and the temperature should rise abnormally, then this abnormal rise in temperature would be taken care of by the action above described. So also if the refrigerating chamber is warm when the system is started, the temperature of such chamber would soon be reduced to the desired temperature, because the system or apparatus would multiply its capacity above the normal as above described.

Provision is made for cutting off the flow of liquid from the absorber into the trap while the latter is discharging its contents, and to this end the outlet pipe 60 for the absorber is provided with a check valve 201 of known construction, which is closed by the pressure in the generator and trap. So also the pipe 68 is provided with a check valve 202 of known construction, which is opened when the strong liquor is being discharged from the trap, and is closed by the pressure in the generator when the trap is being filled.

In Fig. 1, the intermediate vessel $c$ is shown as a dumping trap, but it is not desired to limit the invention in this respect, as other forms of closed vessels or receptacles may be used and provided with equalizer valves 80, 81, which are controlled by the level of the strong liquor in the vessel.

In Figs. 8 and 9, is shown one construction for operating the equalizer valve rod 86 through a lever 204 provided with a float 205. The lever 204 is provided with a crank 206 having the releasing arms 112, 113 which cooperate with the latches 105, 106 loosely mounted on the pivot for the lever 204, and said crank has the pin 94, which in this case engages loose washers 210, 212 on the rod 86 and separated by an enlargement or fixed collar 213 on said rod. The washers are separated from the fixed collars 87, 88, by springs 215, 214 which normally hold the washers against the center collar 213.

The position of the parts shown in Fig. 8 corresponds to the position of the parts shown in Fig. 5, namely, the collar 88 is latched and held so that the valve 81 is closed and cannot be opened, and the rod 86 has been moved in the direction of the arrow 216 by the compression spring 215.

As the float descends to its lowest level, the pin 94 on the crank 206 acts against the washer 210, and gradually compresses the spring 214, thus placing the spring 214 under compression, so that when the arm 113 on the crank engages the pin 110 on the latch 106 and releases the latter from the collar 88, the latter and the rod 86 are moved by the spring 214 so as to permit the valve 80 to be closed and the valve 81 to be opened. When the rod 86 has been moved as described, the latch 105 drops behind the collar 87 and locks the rod 86 against ability to open the valve 80 or to close the valve 81. On the upward movement of the float caused by the filling of the trap or vessel, the pin 94 is brought into engagement with the loose washer 212 and the spring 215 is compressed in the manner as above described, so that when the trap is filled and the latch 105 is released, then the spring 215 moves the rod 86 in the direction of the arrow 216, so as to permit the valve 81 to be closed before the valve 80 is opened.

The vessel 38 and the coil 37 form a heat exchanging device in which the heated weak liquor from the generator is reduced in temperature on its passage through the coil 37 by contact of the latter with the cooler strong liquor from the trap, so that the heated weak liquor on its passage to the absorber is reduced in temperature, and so that the cooler strong liquor on its passage to the generator is heated before it goes to the generator.

By making the vessel 38 of larger capacity than the trap, the volume of strong liquor in vessel 38 is such that there is a continual transfer of heated liquor in the exchanger, even during the period when strong liquor is not flowing into the generator. That is, by having the volume of charged cool liquor in the vesesl 38 greater than the volume of the trap, a better exchange of heat between the outgoing heated weak liquor and the incoming cooler strong liquor is effected, with the result that the apparatus can be run with economy with respect to the heating agent employed to heat the generator, and with economy with respect to the cooling water for the weak liquor cooler 40.

It will be observed that the flow of refrigerant from the generator and condenser to the expansion coil into the absorber is continuous, and that also the supply or flow of weak liquor from the generator to the absorber is a continuous supply or flow, and these continuous operations or flows of these two bodies are not affected by the intermittent flow of the strong liquor from the absorber through the trap to the generator.

In the dome 25 is conventionally shown an analyser of known construction and function.

From the above description, it will be seen that the system is continuous in operation, is entirely automatic and does not require the services of an operator, is hermetically sealed, is safe from explosion, is reliable, highly efficient and inexpensive to install and maintain, and while capable of being made of any desired size is especially applicable for use in households. The branch pipe 27 is provided with a valve 300 and a branch pipe 301 from the pipe 78 is provided with a valve 302, which valves are normally closed and are opened when it is desired to charge or purge the system. The diaphragms 84, 85 of the equalizer valves are subjected at all times to equal and opposing pressures, which balance the diaphragms and enable the rod 86 connected with the same to be moved in opposite directions to open the valves 80, 81 with a minimum power.

One construction of apparatus embodying the invention is hereinshown but it is not desired to limit the invention to the particular construction shown.

Claims.

1. In a refrigerating system, in combination, a generator, an absorber separate from said generator, an expansion chamber between said generator and absorber and connected therewith for the flow of refrigerant from the generator to the absorber through said expansion chamber, and an expansion valve governing the flow of refrigerant to the expansion chamber and responsive to temperature changes in the refrigerated space, means for connecting said generator with said absorber for the flow of weak liquor from said generator to said absorber, a vessel connected with absorber and with said generator for the intermittent flow of strong liquor from the absorber to the said vessel and from said vessel to said generator, means for controlling said intermittent flow of strong liquor, means for connecting said vessel with said absorber and generator for the passage of fluid pressure from said generator to said vessel and from said vessel to sail absorber, and equalizing valves controlling said fluid pressure and arranged to have either of said valves closed before the other is opened.

2. In a refrigerating system, in combination, a generator, an absorber, an intermediate trap connected with said generator and absorber, and pressure equalizing valves controlling communication from said trap to said generator and absorber and arranged so that one of said valves is closed before the other is opened and vice versa.

3. In a refrigerating system, in combination, a generator, an absorber, an intermediate trap connected with said absorber for the flow of liquid from the absorber into the trap and for the flow of gas from the trap to the absorber, and connected with said generator for the flow of liquid from the trap to the generator and for the flow of gas from the generator into the trap, valves controlling the flow of gas from the trap to said generator and absorber, means cooperating with said valves and rendered effective by the quantity of liquid in the trap to ensure that either of said valves is closed before the other is opened, and valves in the liquid outlet pipes from the absorber and trap.

4. In a refrigerating system, in combination, a generator, a condenser, an expansion chamber, an absorber, and means for connecting the same, whereby gaseous refrigerant generated in the generator is condensed in the condenser and supplied to the expansion chamber and then delivered to the absorber, means for connecting said generator with said absorber for simultaneously delivering weak liquor from the generator to the absorber, and means responsive to conditions in the absorber for automatically controlling the supply of weak liquor to the absorber.

5. In a refrigerating system, in combination, a generator, a condenser, an expansion chamber, an absorber, and means for connecting the same, whereby gaseous refrigerant generated in the generator is condensed in the condenser and supplied to the expansion chamber and then delivered to the absorber, means for connecting said generator with said absorber for simultaneously delivering weak liquor from the generator to the absorber, and means for automatically controlling the supply of weak liquor to the absorber.

6. In a refrigerating system, in combination, a generator, a condenser, an expansion chamber, an absorber, and means for connecting the same, whereby gaseous refrigerant generated in the generator is condensed in the condenser and supplied to the expansion chamber and then delivered to the absorber, means for connecting said generator with said absorber for simultaneously delivering weak liquor from the generator to the absorber, and an automatic valve in the weak liquor supply to the absorber, which is responsive to the pressure in the absorber and controls the flow of weak liquor.

7. In a refrigerating apparatus, in combination, a generator, an absorber, means for connecting said generator with said absorber to supply weak liquor from the generator to the absorber, and an automatic valve controlling said supply of weak liquor and responsive to the pressure in the said absorber.

8. In a refrigerating apparatus, in combination, an absorber, means for supplying weak liquor to said absorber, and an automatic valve controlling said supply and responsive to temperature changes in the refrigerated space.

9. In a refrigerating system, in combination, a generator, an absorber, a receptacle connected with both for the flow of gas from said generator to said receptacle and from said receptacle to said absorber, and equalizer valves for controlling the passage of gas from said receptacle to said absorber and from said generator to said receptacle, said valves being arranged to have one positively closed before the other is opened and vice versa.

10. In a refrigerating system, in combination, a generator, an absorber, a receptacle connected with both for the flow of gas from said generator to said receptacle and from said receptacle to said absorber, and equalizer valves for controlling the passage of gas from said receptacle to said absorber and from said generator to said receptacle, said valves being arranged to have one positively closed before the other is opened and vice versa, means to lock said valves in their opened position and means to unlock said valves.

11. In a refrigerating system, in combination, a generator, an absorber, a receptacle connected with both for the flow of gas from said generator to said receptacle and from said receptacle to said absorber, and equalizer valves for controlling the passage of gas from said receptacle to said absorber and from said generator to said receptacle, and means cooperating with said valves and responsive to a change in the quantity of liquid in the vessel to place said means into operative relation to said valves and permit said means to become operative upon a further change in the quantity of the liquid in the vessel.

12. In a refrigerating apparatus, in combination, a generator, an absorber, a receptacle connected with both for the flow of cool liquor from the absorber into said receptacle and from the latter into the generator, a heat exchanging vessel of greater capacity than said receptacle located between the latter and said generator and connected with both, and a conductor for heated liquor from the generator to the absorber cooperating with the said vessel.

13. In a refrigerating system, in combination, a generator, an absorber, a receptacle connected with both for the flow of gas from said generator to said receptacle and from said receptacle to said absorber, and equalizer valves for controlling the passage of gas from said receptacle to said absorber and from said generator to said receptacle, diaphragms cooperating with said valves and acted upon by opposing and equal pressures to balance said diaphragms, means connecting said diaphragms, and means cooperating with said connecting means for moving said diaphragms simultaneously in the same direction.

14. In a refrigerating system, in combination, a generator, an absorber, a receptacle connected with both for the flow of gas from said generator to said receptacle and from said receptacle to said absorber, equalizer valves for controlling the passage of gas from said receptacle to said absorber and from said generator to said receptacle, and means responsive to the quantity of liquid in said receptacle for operating said valves, said means being movable in one direction in response to the quantity of liquid in the receptacle and also being further moved in the same direction independently of the liquid in the receptacle to ensure operation of said valves by said means independently of said liquid.

In testimony whereof, I have signed my name to this specification.

CHARLES W. HAPGOOD.